3,077,438
STABILIZATION OF ORALLY ADMINISTRABLE METHENAMINE MANDELATE SESAME OIL SUSPENSIONS CONTAINING 12-HYDROXY STEARIC ACID TRIGLYCERIDE
Theodore I. Fand, Convent, and Henry B. Zimmerman, Westfield, N.J., assignors to Warner-Lambert Pharmaceutical Company, Morris Plains, N.J., a corporation of Delaware
No Drawing. Filed Dec. 2, 1960, Ser. No. 73,166
1 Claim. (Cl. 167—82)

This invention relates to pharmaceutical compositions and relates more particularly to stable, non-settling suspensions of therapeutically active components in an oil vehicle.

In the preparation of the pharmaceutical dosage forms of many therapeutic substances care must be taken in formulating these substances to avoid contact with water since many of these therapeutic substances are unstable or rapidly become so in the presence of water. Penicillin, for example, as well as many other antibiotics cannot be satisfactorily formulated in any sort of aqueous medium since contact with water causes them to lose their potency very rapidly and such aqueous preparations have little or no shelf life. Tablets or capsules are a satisfactory dosage form and particularly where protection from moisture is to be provided. For pediatric usage it is well known, however, that tablets, capsules and such dosage forms are highly undesirable since few children are able or willing to swallow such forms of medication. In pediatrics the use of some form of liquid preparation is essential. Since the vehicle of choice is water in almost every instance, the problem of the formulation of liquid preparations of therapeutic substances which are unstable or which decompose in water becomes very acute. The use of various oily vehicles as the liquid medium has been proposed but few of these therapeutic substances are soluble in the common oil vehicles which are acceptable in good pharmaceutical practice. Accordingly, resort has been to formulating these substances as suspensions. One of the disadvantages of formulating a solid therapeutic substance in a liquid vehicle where it is only in suspension is that the solid material tends very strongly to settle out of the oily vehicle after standing, and it is frequently very difficult to redisperse the solid material in a uniform fashion throughout the oil comprising the liquid vehicle. If the degree of agitation is insufficient when attempting to redisperse the solid therapeutic substance in the oily medium from which it has settled, the dosage administered will be highly uncertain. Again, where the redispersion of the therapeutic substance is known to be particularly difficult the medication must be used within a short time after it has been prepared since the settling of the solid therapeutic substance will render it almost impossible to use. All these disadvantages are common to oil suspensions whether they are for oral or for parenteral administration. For oral preparations an additional factor in formulating an acceptable suspension is the question of palatability. Any agent which can be used effectively to stabilize an oil suspension of a therapeutic substance must also be acceptable to the taste. In the past, these and other problems have made oil or non-aqueous suspensions of therapeutic substances a dosage form of only limited acceptance.

It is, therefore, an important object of this invention to provide stable suspensions of therapeutic substances in a non-aqueous medium which not only remain uniform in their physical characteristics for extended periods of time but which are easily prepared by the usual pharmaceutical procedures and which are highly acceptable and palatable to children, to convalescents and to those of advanced age where ease of administration and palatability are important factors.

Another object of this invention is the provision of stabilized pharmaceutical preparations comprising suspensions of solid material in a non-aqueous medium wherein any settling of the solid material is minimized and wherein the stabilization is achieved with but small amounts of a safe and effective stabilizing agent.

Other objects of this invention will appear from the following detailed description.

We have now found that highly stable suspensions of active therapeutic substances in a non-aqueous medium may be obtained if the triglyceride or 12-hydroxystearic acid is incorporated in the suspension in an amount sufficient to act as a stabilizing agent. By incorporating from at least 0.1% of this agent and up to about 1.0% on the weight of the oil in which the therapeutic substance is suspended, the compositions obtained are rendered extraordinarily stable to settling and the solid substances suspended in the oil remain suspended almost indefinitely without any signs of undesirable settling. Higher amounts, say 1 to 5% on the weight of the oil may be utilized if a composition of the consistency of a salve or ointment is desired.

The compositions prepared in accordance with our invention retain their homogenity over extended periods of time and over wide ranges of temperature, thus permitting uniform and accurate dosages to be administered on the basis of volume without the necessity for prolonged agitation prior to the administration of the composition to ensure a homogeneous distribution of the therapeutic substance. The bland nature of this stabilizing agent imparts a high degree of palatability to the composition and, should the therapeutic substance itself possess a taste which is not entirely acceptable, suitable oil-soluble flavoring or flavor masking agents may be incorporated in the composition.

As examples of oily vehicles which may be utilized for suspending the solid therapeutic substance there may be mentioned such pharmaceutically acceptable oils as mineral oil, sesame oil, olive oil, peanut oil, corn oil, specially refined coconut oil and cottonseed oil.

Our invention is particularly applicable in the preparation of stable suspensions of therapeutic substances such as methenamine mandelate, penicillin and others exhibiting instability in the presence of water. Preferably, the solid therapeutic substance which is utilized should be in a relatively finely-divided form for maximum absorption and should preferably be of at least 100 to about 125 mesh or finer.

In the process of preparing the novel therapeutic compositions of our invention, the oil which is to be employed is preferably heated, say to a temperature of about 30° C. to 55° C., for example, about 40° C., and, after a portion of the heated oil is added to the desired amount of triglyceride of 12-hydroxystearic acid which is employed, the oil is mixed with the stabilizing agent for a sufficient time to produce a mobile slurry. The slurry formed is then transferred to the main body of the warmed oil where it is mixed and this mixture is then passed through a colloid mill, roller mill or ball mill or similar mixer where a shearing action is exerted on the components. Preferably, the temperature should be carefully controlled during homogenization so that it does not rise above a maximum of about 55° C. to avoid forming unduly or excessively viscous solutions. A portion of the homogenized mixture of oil and the triglyceride of 12-hydroxystearic acid is then added to a predetermined quantity of the solid therapeutic substance, the quantity depending upon the final concentration desired, and the components mixed to form a mobile slurry. The slurry is then returned to the main body of the homogenized mixture of oil and stabilizing agent and the mixture thus obtained is again passed through a colloid mill. Careful control of the temperature is maintained with the maximum being held below 55° C. for the reasons given above. After passing through the colloid mill and being cooled to room temperature, color or flavoring materials may then be added and uniformly dispersed throughout the mixture.

The liquid composition thus obtained comprises a stabilized suspension of the solid therapeutic substance in the non-aqueous or oily medium employed. The solid materials remain in suspension almost indefinitely and the homogenous nature of this suspension is fully retained without alteration. Thus, the novel compositions of our invention may be utilized immediately after preparation or they may be stored for prolonged periods for subsequent use. The solid material remains suspended in the oil and thus insures the uniform distribution of the solid material in the suspension.

It is a significant feature of the compositions of this invention that the triglyceride of 12-hydroxystearic acid, that is hydrogenated castor oil, is immiscible with the pharmaceutically acceptable oil which is used as a liquid vehicle for the suspensions. Thus, the compositions differ markedly from those of the prior art wherein other hydrogenated oils which are oil miscible have been included to regulate consistency. Exemplary of such prior art compositions are those described in U.S. Patent 2,661,315 to Jurist et al. It has been found that oil miscible hydrogenated oils do not act as stabilizing agents to prevent settling of the suspended therapeutic agent. Accordingly, the compositions of this invention represent a significant and truly unexpected improvement over compositions of the prior art as exemplified by those described by the Jurist et al. patent.

In order to further illustrate our invention but without being limited thereto the following examples are given:

*Example I*

100 gallons of sesame oil, USP, are heated to a temperature of 40° C. 10 gallons of the heated oil are removed and mixed with about 2.8 kilograms of the triglyceride of 12-hydroxystearic acid until a mobile slurry is obtained. The slurry thus formed is returned to the remaining heated oil and after mixing the resulting mixture is passed through a colloid mill while maintaining the temperature below 55° C. A portion of the homogenized mixture is then added to a mixture of 19.8 kilos of methenamine mandelate, 2.8 kilos of sodium cyclohexylsulfamate and 0.7 kilos of sodium saccharin, all finely-divided enough to pass 125 mesh, and the liquid and solid mixed until a mobile slurry is formed. The slurry thus formed is returned to the remainder of the homogenized mixture of sesame oil and stabilizer and, after some mixing, the whole is again passed through a colloid mill while maintaining the temperature below 55° C. After the homogenized mixture thus obtained is cooled to room temperature, any desired flavoring materials are added.

*Example II*

A quantity of 0.75 part by weight of the triglyceride of 12-hydroxystearic acid is homogenized with 94.25 parts by weight of warmed sesame oil at 40° C., the temperature being controlled so as not to exceed 55° C. during the homogenization. The resulting suspension is then homogenized with 5.0 parts by weight of finely divided methenamine mandelate (minus 100 mesh), the temperature being controlled so as not to exceed 55° C.

The resulting suspension is allowed to stand for 12 hours and is then thoroughly agitated and poured into a 100 ml. graduated cylinder. After 72 hours, no evidence of settling is observed, indicating the remarkable stability of the composition.

This application is a continuation-in-part of our application Serial No. 616,145, filed October 16, 1956, now abandoned.

It is understood that the foregoing detailed description is given merely by way of illustration and that many variations may be made therein without departing from the spirit of our invention.

Having described our invention, what we desire to secure by Letters Patent is:

In a process for the prepartion of a therapeutic composition for oral administration consisting of a stable suspension of finely-divided methenamine mandelate in sesame oil and containing as a stabilizing agent for said suspension the triglyceride of 12-hydroxy stearic acid in an amount of from 0.1 to 1.0% on the weight of the sesame oil, the steps which consist of heating the sesame oil to be incorporated in said composition to a temperature of 30° C. to 55° C., adding the triglyceride of 12-hydroxy stearic acid to a portion of the heated sesame oil and then mixing to form a mobile slurry, adding the slurry obtained to the main body of the heated sesame oil and homogenizing the resulting mixture of sesame oil and triglyceride of 12-hydroxy stearic acid, combining a portion of the homogenized mixture of sesame oil and said stabilizing agent with finely-divided methenamine mandelate of a particle size sufficient at least to pass 100 mesh, and uniformly dispersing this mixture of methenamine mandelate, sesame oil and stabilizing agent throughout the remaining homogenized mixture by combining the same and subjecting the total mixture obtained to homogenization while maintaining the homogenization temperature at a maximum of about 55° C.

References Cited in the file of this patent

UNITED STATES PATENTS

| | | |
|---|---|---|
| 2,124,321 | Tisza | June 19, 1938 |
| 2,445,935 | Bondi | July 27, 1948 |
| 2,445,936 | Butcosk | July 27, 1948 |
| 2,450,221 | Ashburn et al. | Sept. 28, 1948 |
| 2,483,259 | Budner et al. | Sept. 27, 1949 |
| 2,607,734 | Sproule et al. | Aug. 19, 1952 |
| 2,661,315 | Jurist et al. | Dec. 1, 1953 |
| 2,673,838 | Veatch et al. | Mar. 30, 1954 |
| 2,895,881 | Hamada | July 21, 1959 |

OTHER REFERENCES

"N.N.R.—1954"; New and Nonofficial Remedies, Council on Pharmacy and Chemistry, American Medical Association, J. B. Lippincott, Philadelphia, Pa., entry "Methenamine Mandelate" (Mandelamine) (Nepera), pages 90–91.

"Properties and Application of Castor Wax (12 Hydroxystearin)," Baker Castor Oil Co., 120 Broadway, New York 5, New York, Technical Bulletin No. 7, revised 3-54 (pages 3, 5–19, and 21).